United States Patent [19]
Gilbert et al.

[15] 3,659,178
[45] Apr. 25, 1972

[54] CAPACITOR CHARGING CIRCUIT
[72] Inventors: Everett A. Gilbert, Denville; Channing S. Williams, Rockaway, both of N.J.
[73] Assignee: RFL Industries, Inc., Boonton, N.J.
[22] Filed: May 19, 1970
[21] Appl. No.: 48,672

Related U.S. Application Data
[62] Division of Ser. No. 744,439, July 12, 1968, Pat. No. 3,560,805.

[52] U.S. Cl...............................320/1, 307/109, 317/157.5
[51] Int. Cl. ....................................H02m 5/40, H01f 13/00
[58] Field of Search.....................320/1; 317/157.5; 307/109

[56] References Cited

UNITED STATES PATENTS 3,229,158  1/1966  Jensen.................................320/1 X
3,432,725  3/1969  Rotch..................................320/1 X
3,223,887  12/1965  Brown.................................320/1 X Primary Examiner—Bernard Konick
Assistant Examiner—Stuart Hecker
Attorney—Rudolph J. Jurick

[57] ABSTRACT

Apparatus for selectively decreasing the magnetic intensity of a permanent magnet by passing current pulses of decaying waveform through a pull-down coil. A capacitor is alternately charged to a predetermined voltage level and discharged through the pull-down coil. Control means are provided to pass through the pull-down coil either a single current pulse of predetermined maximum amplitude, or a continuous series of such pulses or a train of current pulses of increasing initial amplitude.

1 Claims, 4 Drawing Figures

120 — A-GAUSSMETER OUTPUT VOLTAGE

113 — B-OUTPUT OF D.C. AMPLIFIER

C-RAMP VOLTAGE

D-CURRENT PULSES THROUGH PULL-DOWN COIL

CAPACITOR CHARGING CIRCUIT

This application is a division of our application Ser. No. 744,439, filed July 12, 1968, and entitled Apparatus For Treating Permanent Magnets, now U.S. Pat. No. 3,560,805.

BACKGROUND OF THE INVENTION

In the manufacture of electrical devices incorporating a permanent magnet it is customary to charge the magnet to saturation and thereafter to subject the magnet to a demagnetizing force in order to stabilize the magnet and/or to set the strength of the magnet to a desired level. Generally, this is done by subjecting the magnet to an alternating magnetic flux field of relatively high initial amplitude and then reducing the flux field to zero.

Various forms of apparatus are available for pulling down a permanent magnet and this invention is directed to improved apparatus which affords increased versatility of use, which operates to pull down a magnet to a precise magnetic strength, and which is particularly adapted for the rapid treating of magnets on a production basis.

SUMMARY OF THE INVENTION

A capacitor is connected to the output junctions of a full wave rectifier energized by the voltage developed in a selected tap of a multitaped secondary winding of a power transformer. The transformer primary winding is connected to a source of a.c. power through a pair of silicon controlled rectifiers arranged in opposite sense, which rectifiers are separately controlled by the voltages developed in a pair of secondary windings of a pulse transformer. The primary coil of the pulse transformer forms part of a unijunction oscillator circuit, whereby the silicon rectifiers conduct during alternate half cycles of the a.c. power. A pull-down coil is connected to the capacitor through a third silicon controlled rectifier. When the capacitor is charged, a first Schmidt trigger is actuated to provide a first positive output voltage, which voltage causes a clamping transistor to conduct, thereby terminating oscillation of the unijunction oscillator circuit. At the same time, the trigger output voltage is differentiated and applied to a first one-shot multivibrator, causing such vibrator to provide a positive output voltage pulse of predetermined time duration, which voltage pulse is applied to the gate electrode of the third silicon controlled rectifier. This results in the flow of a current pulse, of decaying waveform, through the pull-down coil. The output voltage pulse of the first multivibrator also is applied to the clamping transistor, thereby to prevent the oscillator circuit from oscillating during the time when the capacitor is discharging. A second one-shot multivibrator is actuated upon termination of output voltage pulse of the first multivibrator, said second multivibrator providing a positive output voltage pulse which also is applied to the clamping transistor. Upon the termination of the voltage pulse from the second multivibrator, all positive voltages have been removed from the clamping transistor, the unijunction oscillator circuit goes into oscillation and the capacitor is again charged. Normally, the circuit operates continuously to effect an alternate charging and discharging of the capacitor. Manually controllable means are provided for actuation of the second multivibrator so as to pass only a single, decaying current pulse through the pull-down coil.

Additionally, the apparatus includes a ramp generator for applying a negative-going voltage to the first Schmidt trigger, thereby causing the flow of a train of current pulses through the pull-down coil for each cycle of the ramp voltage, the current pulses of each train having increased initial amplitudes. A gaussmeter provides a d.c. control voltage which varies in magnitude with the magnetic strength of the magnet being treated. A reference d.c. voltage, adjustable in magnitude to correspond to the desired magnetic intensity of the magnet, is combined with the control voltage and the difference voltage is applied to a d.c. amplifier, the output voltage of the amplifier being applied to a third Schmidt trigger. When the amplifier output voltage reaches the triggering level of the third trigger, a positive voltage is again applied to clamping transistor, thereby terminating oscillation of the unijunction oscillator circuit. This output voltage also results in the actuation of a clamping circuit which stops the ramp generator, and the energization of a first signal lamp to indicate that the magnet has been pulled down to the desired level. In the event the amplitude of the current pulses flowing through the pull-down coil is not sufficient to pull the magnet down to the desired level, the ramp generator runs to saturation. A fourth Schmidt trigger is actuated just prior to saturation of the ramp generator, actuation of said trigger resulting in the energization of a second lamp to indicate the magnet-treating operation has not been completed, thereby necessitating an increase in the magnitude of the charging voltage applied to the capacitor.

An object of this invention is the provision of improved apparatus for reducing the magnetic intensity of a permanent magnet.

An object of this invention is the provision of magnet-treating apparatus comprising a capacitor, means alternately charging the capacitor by an adjustable d.c. voltage and discharging the capacitor through a pull-down coil, thereby resulting in the flow of a decaying current pulse through the coil, means conditioning the apparatus for continuous operation whereby a series of spaced current pulses are passed through the pull-down coil, and means conditioning the apparatus for single cycle operation whereby a single current pulse is passed through the pull-down coil.

An object of this invention is the provision of magnet-treating apparatus having a pull-down coil connected to a capacitor through a normally open switch means, a charging circuit for charging the capacitor, means closing said switch means when the capacitor is substantially charged to a predetermined level and means opening the charging circuit after the capacitor is discharged.

An object of this invention is the provision of apparatus comprising a capacitor, means for alternately charging the capacitor by a d.c. voltage of adjustable magnitude and discharging the capacitor through a pull-down coil, means controlling the discharge of the capacitor so as to result in the flow of a decaying current pulse through the pull-down coil upon the discharge of the capacitor, and automatic means for gradually increasing the magnitude of the charging voltage applied to the capacitor, thereby resulting in an increase in the initial amplitude of succeeding current pulses passing through the pull-down coil.

An object of this invention is the provision of magnet-treating apparatus of the class wherein a charged capacitor is discharged through a pull-down coil to reduce the magnetic intensity of a permanent magnet to a desired level, said apparatus including means for automatically increasing the magnitude of the charging voltage applied to the capacitor after each discharge thereof through the pull-down coil, means providing a control voltage which varies in magnitude with the magnetic strength of a permanent magnet positioned within the flux field of the pull-down coil, and means terminating the charging of the capacitor when the control voltage has a magnitude corresponding to a desired magnetic intensity level of the magnet.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views.

DESCRIPTION OF PREFERRED EMBODIMENT

Figure 1:
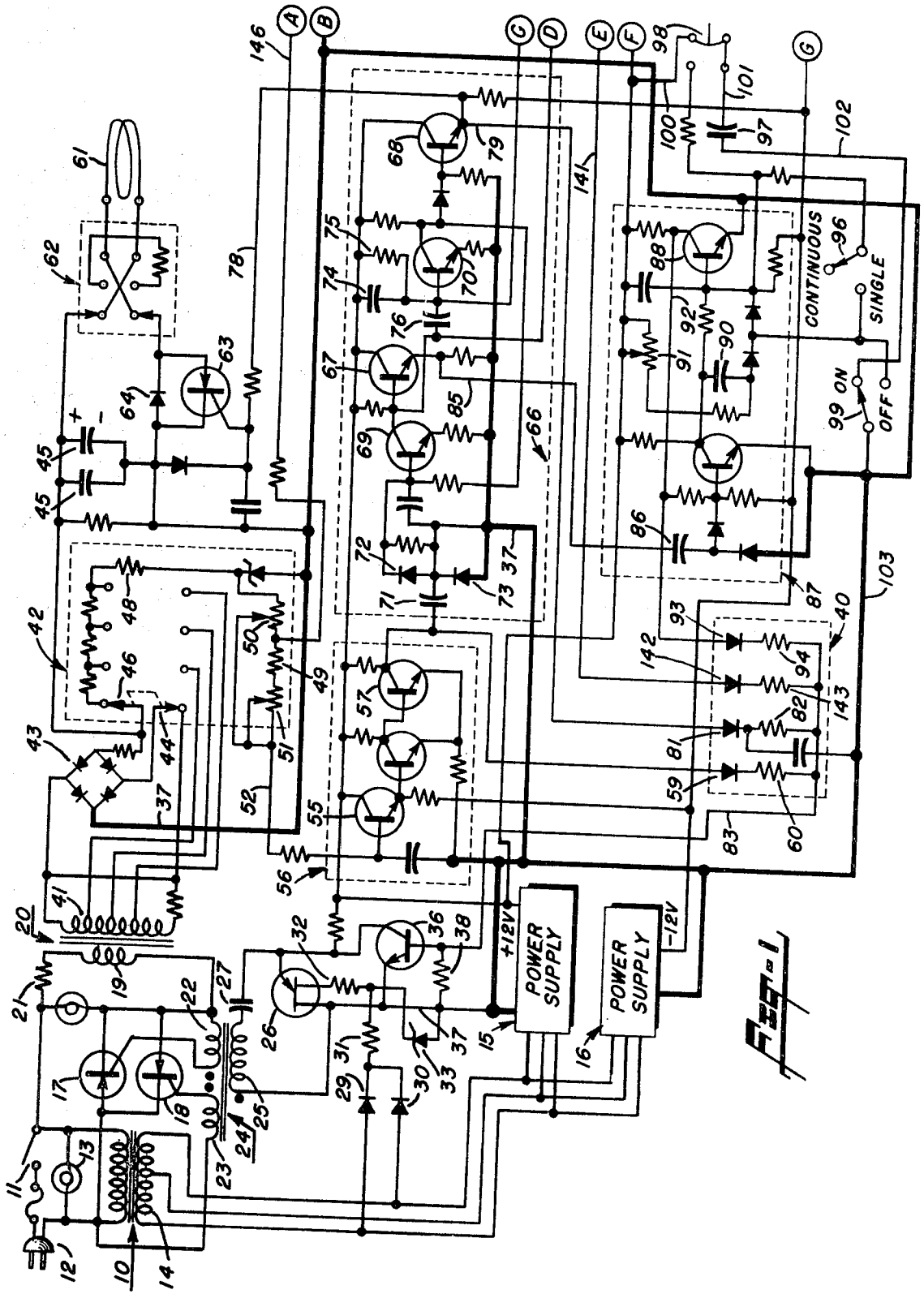
FIG. 1 is a circuit diagram of one portion of apparatus made in accordance with this invention.

Referring now to FIG. 1, the power transformer 10 is energized upon closure of the line switch 11, assuming the plug 12 is connected to a 110 volt, a.c. line. A pilot lamp 13 serves to indicate power is applied to the apparatus. The voltage developed in the center-taped secondary winding 14 is applied to conventional power supplies 15 and 16 which provide d.c. output voltages of +12 volts and −12 volts, respectively. A pair of silicon controlled rectifiers 17 and 18 are connected in opposite sense to one side of the power line and an end of the primary winding 19 of a charging transformer 20, the other end of such winding being connected to the other side of the power line through a current limiting resistor 21. The gate electrodes of the rectifiers 17 and 18 are separately connected to the secondary coils 22 and 23 of a pulse transformer 24 having a primary winding 25 connected across the emitter electrode and the base-one electrode of a unijunction transistor 26 through a capacitor 27. The voltage developed in the secondary winding of the power transformer 10 is applied to the two base electrodes of this transistor through the rectifiers 29 and 30 and the limiting resistor 31, the maximum magnitude of the voltage applied to the transistor being determined by a zener diode 33. With +12 volts applied between the emitter and the base-two electrodes, the transistor 26 oscillates and drives the pulse transformer 24, whereby the silicon controlled rectifiers 17 and 18 conduct during alternate half cycles of the input power. The pulse transformer serves also to isolate the control circuitry from the a.c. power.

The collector and emitter electrodes of a normally non-conducting clamping transistor 36 are connected across the emitter and base-two electrodes of the unijunction transistor 26, the base of the transistor 26 being connected to the common ground lead 37 through the resistor 38. When a positive voltage is applied to its base, the clamping transistor 36 conducts and grounds the emitter of the unijunction transistor, whereby the unijunction transistor ceases to oscillate. Positive voltages are applied to the base of the clamping transistor under specific conditions of circuit operation, as will be described hereinbelow. It is here pointed out that the positive voltages, which inhibit oscillation of the unijunction transistor, are obtained from an inhibiting network identified by the numeral 40.

Normally, the unijunction transistor goes into oscillation upon closure of the line switch 11, whereby a voltage is developed in the multitaped secondary winding 41 of the charging transformer 20. The lower, stationary contacts of an amplitude control switch 42 are connected to individual taps of the winding 41, whereby an a.c. voltage of a selected, predetermined magnitude is applied across the input junctions of a full wave rectifier 43 upon adjustment of the movable switch arm 44. One output junction of this rectifier is connected to the common ground lead 37. The other output junction is connected to one side of the charging capacitors 45 and to the switch arm 46 associated with the upper, stationary contacts of the amplitude control switch 42. Fixed resistors, having predetermined ohmic values, are connected across such upper contacts, which resistors, together with the fixed resistors 48, 49 and potentiometers 50, 51, form a voltage divider network. The two switch arms are coupled together for simultaneous movement thereof. When the switch arm 44 is positioned to connect the rectifier 43 to a selected transformer tap, the switch arm 46 effects a corresponding change in voltage divider network. Thus, a d.c. voltage of predetermined magnitude appears across the lead 52 and the common lead 37, which voltage is applied to the base electrode of a cathode follower 55 forming part of a Schmidt trigger 56. The two potentiometers 50 and 51 provide a course and fine adjustment, respectively, of the voltage applied to the cathode follower, thereby to trigger the Schmidt trigger. When the voltage output of the voltage divider network equals the triggering voltage of the Schmidt trigger, the charging voltage across the capacitors 45 will be at some predetermined level less than the peak value. When the trigger point is reached, the normally conducting transistor 57 transfers to the non-conducting state, thereby resulting in a +12 volt output voltage, which voltage is applied to the base of the clamping transistor 36 through the rectifier 59 and resistor 60 of the inhibiting network 40. This causes the unijunction transistor 26 to cease oscillating whereby the charging voltage is removed from the charging capacitors 45.

The charging capacitors are connected to the pull-down, or magnet-treating, coil 61 through a reversing switch 62 and a silicon controlled rectifier 63 which constitutes a gate for controlling the discharge of the capacitors. The switch 62 is a contact-make before contact-break type, thereby to protect the rectifier 63 from damage by the high kick-back voltage which otherwise would arise upon opening of the circuit to the pull-down coil. Connected across the silicon controlled rectifier is a diode 64 which prevents the discharge of the capacitors through the coil. When a positive voltage is applied to the gate electrode of the rectifier 63, as will be described hereinbelow, the gate closes and the capacitors 45 discharge through the coil 61. Since the capacitors 45 and the coil 61 form a resonant circuit, the current will reverse and charge the capacitors in the reverse direction through the diode 64. Consequently, the current flowing through the coil has a decaying waveform.

A positive voltage pulse for closing the gate 63 is provided by a gate generator 66 comprising two emitter followers 67, 68 and a pair of transistors 69 and 70 forming a one-shot multivibrator. The input circuit of the gate generator is coupled to the output circuit of the Schmidt trigger 56 through the capacitor 71 and the diodes 72 and 73. The output voltage of the Schmidt trigger is differentiated by the capacitor 71, resulting in the application of a sharp voltage pulse to the base of the multivibrator transistor 69. This results in a square wave output voltage pulse appearing in the output circuit of the emitter follower 68, said pulse having a time duration of about 100 milliseconds as determined by the constants of the capacitor 76 and resistor 75, connected across the base and collector of the multivibrator transistor 70, and the capacitor 76 coupling the base of the transistor 70 to the collector of the transistor 69. The positive output voltage pulse of the emitter follower 68 is applied to the gate electrode of the silicon controlled rectifier 63 (lead 78) allowing the capacitors 45 to discharge through the pull-down coil 61. The 100 millisecond period during which the rectifier 63 is conducting is somewhat longer than the time required for the complete decay of the damped current pulses flowing through the coil. At the same time, the 100 millisecond, positive voltage pulse is applied to the base of the clamping transistor 36 through the lead 79, rectifier 81 and resistor 82 (of the inhibiting network 40) and the lead 83. Consequently, the unijunction transistor 26 is inhibited from oscillating during the period when the capacitors 45 are discharging.

The emitter electrode of the emitter follower 67 is connected by the lead 85 to a capacitor 86 in the input circuit of a variable delay, one-shot multivibrator 87, thereby to apply to this multivibrator a positive voltage pulse upon the termination of the output voltage pulse provided by the gate generator 66. This positive voltage pulse is differentiated by the capacitor 86 and triggers the multivibrator 87, thereby resulting in the appearance of a square wave, positive voltage pulse in the output circuit of the multivibrator transistor 88, the time duration of such voltage pulse being determined by the capacitor 90 and the rheostat 91. This positive voltage pulse is applied to the base of the clamping transistor 36 through the lead 92, the rectifier 93 and resistor 94 (of the inhibiting network 40) and the lead 83. Upon the termination of this voltage pulse all inhibiting voltages have been removed from the clamping transistor 36 and the unijunction transistor again goes into oscillation. A single-pole switch 96 is operable to one or another position, thereby to control the operation of the multivibrator 87. When the switch is set in the illustrated CONTINUOUS position, this multivibrator will provide an output voltage having a definite time duration determined by the setting of the potentio-meter 91 and one such voltage pulse will appear for each operation of the multivibrator 66, that is, after the completion of each discharge cycle of the capacitors 45. However, when the switch 96 is closed to the SINGLE position, the multivibrator 87 is grounded so that once such multivibrator is tripped it will remain in the tripped position indefinitely, thereby maintaining a positive voltage on the base of the clamping transistor and preventing oscillation of the unijunction transistor. It will be noted that a capacitor 97 is charged through the normally closed contacts of a spring-biased, push button switch 98, provided the switch 99 is set in the illustrated ON position; the circuit being traced as follows: lead 100, switch 98, lead 101, capacitor 97, lead 102, switch 99 and lead 103. Now, upon momentary depression of the push button switch 98, the capacitor 97 discharges to the base of the multivibrator transistor 88. This turns off the multivibrator long enough to allow for a single charging and discharging cycle of the capacitors 45. Thus, the push-button switch is used to affect the flow of a single train of decaying current pulses through the pull-down coil 61. When the switch 99 is set to the OFF Position the multivibrator is clamped in the "turned-on" position so that the unijunction transistor 26 cannot oscillate to effect a charging of the capacitors 45 and, also, the charging circuit to the capacitor 97 is broken to prevent this capacitor from discharging upon depression of the switch 98.

The above-described apparatus constitutes a manually operable magnet treating apparatus, inasmuch as the flow of current pulses through the pull-down coil can only occur upon the manual operation of the two switches 96 and 99 and the maximum amplitude of such current pulses is controlled by the manual adjustment of the amplitude control switch 42 and the potentiometers 50 and 51.

To summarize operation of the apparatus to this point, it is assumed that a permanent magnet which has been charged to saturation is to be treated, or pulled down, to a desired magnetic intensity level as measured by a conventional gaussmeter having a sensing probe positioned in the flux field of the magnet. The permanent magnet is positioned within the pull-down coil 61, the switches 96 and 99 are set in the illustrated positions and the amplitude control switch 42 is set to some initial position. Upon closure of the line switch 11 the unijunction transistor oscillates resulting in the application of a charging voltage, of predetermined magnitude, to the capacitors 45. At the same time, a triggering voltage is applied to the Schmidt trigger 56, resulting in the application of a positive voltage on the base of the clamping transistor 36 through the inhibiting network 40, whereupon the unijunction transistor ceases to oscillate. The positive output voltage from the Schmidt trigger is differentiated by the capacitor 71 causing the gate generator 66 to turn on, thereby applying a positive voltage pulse, of approximately 100 millisecond duration, to the gate electrode of the silicon controlled rectifier 63, resulting in the discharge of the capacitors 45 through the pull-down coil 61. At the same time, this 100 millisecond voltage pulse is applied to the clamping transistor through the inhibiting network 40 to prevent oscillation of the unijunction transistor during discharge of these capacitors. Upon termination of the 100 millisecond voltage pulse, the gating rectifier 63 is closed and the one-shot multivibrator 87 is turned on, the latter resulting in the application of a positive voltage pulse to the clamping transistor, through the inhibiting network 40, thereby maintaining the unijunction transistor in the non-oscillating state even though the capacitors have been discharged. The voltage pulse appearing in the output of the multivibrator 87 has a time duration determined by the setting of the potentiometer 91 and upon the termination of this voltage pulse there no longer is a positive voltage on the base of the clamping transistor and the unijunction transistor again goes into oscillation to effect a second charging of the capacitors 45. Although the adjustment of the amplitude control switch 42 changes the magnitude of the charging voltage in discrete steps, the adjustment of the course and fine potentiometers 50 and 51, respectively, controls the triggering voltage applied to the Schmidt trigger. Thus, these potentiometers provide a means for controlling the actual level to which the capacitors 45 are charged. In any event, after a few adjustments of the amplitude control switch and/or the potentiometers, the current pulses flowing through the pull-down coil will have the necessary amplitude to reduce the magnetic intensity of the permanent magnet to the desired level. The apparatus now is set for the rapid treatment of a plurality of similar permanent magnets, each magnet being inserted into the pull-down coil when the switch 99 is set to the OFF position. In fact, once the apparatus has been adjusted as described, the switch 99 may remain in the ON position and the switch 96 set to the SINGLE position. Such setting of the switch 99 grounds the multivibrator 87 so that once it is turned on a continuous positive voltage is applied to the base of the clamping transistor 36 to prevent the unijunction transistor from oscillating. However, a momentary depression of the push button switch 98 results in the discharge of the capacitor 94 through an input circuit of the multivibrator transistor 88, thereby turning off the multivibrator for a period of time sufficient to allow the capacitors 45 to again become charged. Thus, upon each depression of the push button switch, a single train of decaying current pulses through the pull-down coil. The peak amplitude of such current pulses is adjusted by means of the amplitude control switch 42 to effect the desired treating of the particular permanent magnet.

In the above description of the operation of the apparatus, it was assumed that a gaussmeter was used to measure the magnetic intensity of the permanent magnet being treated. When the magnet of an assembled permanent magnet, movable coil type of electrical indicating instrument is to be treated, the assembly is placed within the pull-down coil and a current is passed through the movable coil. Such current has a predetermined magnitude which normally will result in the alignment of the instrument pointer with the top mark of the associated, calibrated scale. However, since the instrument magnet has been charged to the saturation point, the meter pointer will deflect above the top scale mark. The apparatus is now operated in either the described continuous or single treating mode, and the amplitude control switch 42 is advanced until the instrument pointer is brought into alignment with the top scale mark.

Figures 2, 3:
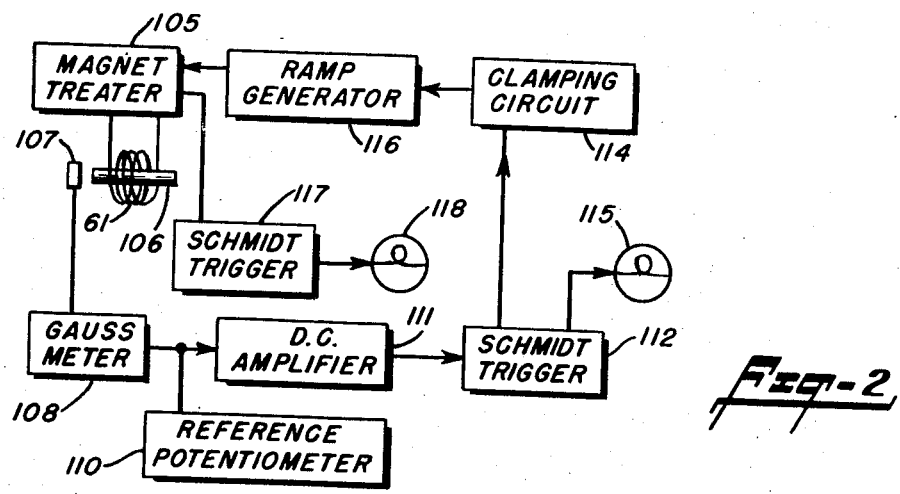
FIG. 2 is a block diagram of the complete apparatus.
FIG. 3 is a set of curves showing the relative magnitudes of voltages developed by specific elements of the apparatus and the waveform of current pulses passing through the pull-down coil when the apparatus is conditioned for automatic operation.

Reference now is made to FIG. 2 which is a block diagram showing the above-described manually adjustable magnet treater, here identified by the numeral 105, in combination with additional components for automatically increasing the amplitude of the current pulses passed through the pull-down coil 61. A saturated magnet 106, to be treated, is positioned within the pull-down coil 61 and the sensing probe 107 of a gaussmeter 108, is positioned to measure the maximum magnetic intensity of the magnet. A suitable fixture is employed to retain fixed, predetermined positions between the coil, magnet and probe. A conventional gaussmeter is provided with various adjustments for purposes of calibration. Shielded standard magnets and zero gauss chambers are used to check and adjust the circuitry of the gaussmeter so that the pointer of the associated indicating instrument tracks with the zero and top mark of a scale which is calibrated directly in gauss values. The gaussmeter provides a d.c. output voltage which varies in magnitude in correspondence with the intensity of the magnetic field at the sensing probe. This output voltage is applied to the indicating instrument to provide a direct reading of magnetic field strength and, also, is available for actuation of a remote device.

With the sensing probe positioned in the fixture, Curve A of FIG. 3 represents the output voltage of the gaussmeter. Specifically, upon insertion of the magnet 106 into the fixture, the magnitude of this voltage is a maximum and then decreases as the magnet is treated. The gaussmeter output voltage is added to a reference voltage obtained from a reference potentiometer 110 and the difference voltage is applied to a d.c. amplifier 111. This amplifier produces an output voltage (Curve B, FIG. 3) which starts out negative and progresses in a positive direction until it reaches the triggering voltage of a Schmidt trigger 112, the triggering point being identified by the numeral 113 on the curve. When this occurs, the trigger flips, resulting in the application of a positive voltage to a clamping circuit 114 and, at the same time, resulting in the energization of the "complete light" 115. The clamping circuit 114 controls the operation of a ramp generator 116 which normally produces a negative going voltage having a linear ramp form. This ramp voltage, (curve C of FIG. 3) is applied to the magnet treater 105 to control the magnitude of the charging voltage applied to the capacitors 45, see FIG. 1. As the ramp voltage becomes more negative, these capacitors will charge to higher and higher voltages before the firing point of the trigger 112 is reached. As a result, a train of current pulses of increasing initial magnitude (Curve C of FIG. 3) are passed through the pull-down coil 61. This results in the gradual decrease in the intensity of the magnet 106 as long as the desired flux level has not been reached and until the ramp generator 116 saturates. Just before saturation of the ramp generator, another Schmidt trigger 117 is flipped resulting in the energization of the "incomplete light" 118.

Assume now that the saturated magnet 106 has an initial magnetic intensity of 10,000 gauss and that the magnet is to be pulled down to provide an intensity of 6,000 gauss. The sensing probe 107 is slowly moved away from the magnet until the pointer of the indicating instrument of the gaussmeter is aligned with the 6,000 gauss mark of the scale. The reference potentiometer 110 is adjusted until the complete light 115 is energized, under which condition the output of the amplifier 111 corresponds to the point 113 on Curve B. This adjustment is made when the switch 99 (FIG. 1) of the magnet treater is set in the OFF position. The sensing probe 107 now is moved into engagement with the magnet 106 and the switch 99 set to the ON position, whereby a train of current pulses, Curve C, pass through the pull-down coil upon each generation of the ramp voltage by the ramp generator 116. Initially, the amplitude control switch 42 (FIG. 1), is set to apply a relatively low maximum charging voltage across the capacitors 45, thereby to prevent over-treating of the magnet. Under this condition, the current pulses through the pull-down coil will reach a relatively low maximum amplitude when the ramp generator reaches the saturation point, which amplitude is not sufficient to result in the desired pull-down of the magnet, whereupon the incomplete light 118 is energized. With the ramp generator still running, the selector switch 42 and/or the potentiometers 50, 51 (FIG. 1) are adjusted to increase the charging voltage applied to the capacitors 45. Such increasing of the charging voltage is continued, manually, until the complete light 115 is energized, indicating that the magnetic strength of the magnet has been pulled down to the desired level. Under this condition, the output voltage of the gaussmeter corresponds to the point 120 on Curve A, the output of the amplifier 111 corresponds to the point 113 on Curve B, the Schmidt trigger 112 has flipped, and the ramp generator has been turned off by the clamping circuit 114. The magnet now can be removed from the pull-down coil. It is here pointed out that the ramp voltage preferably has a mild slope to obtain several series of current pulses through the pull-down coil for each ramp cycle.

Figure 4:
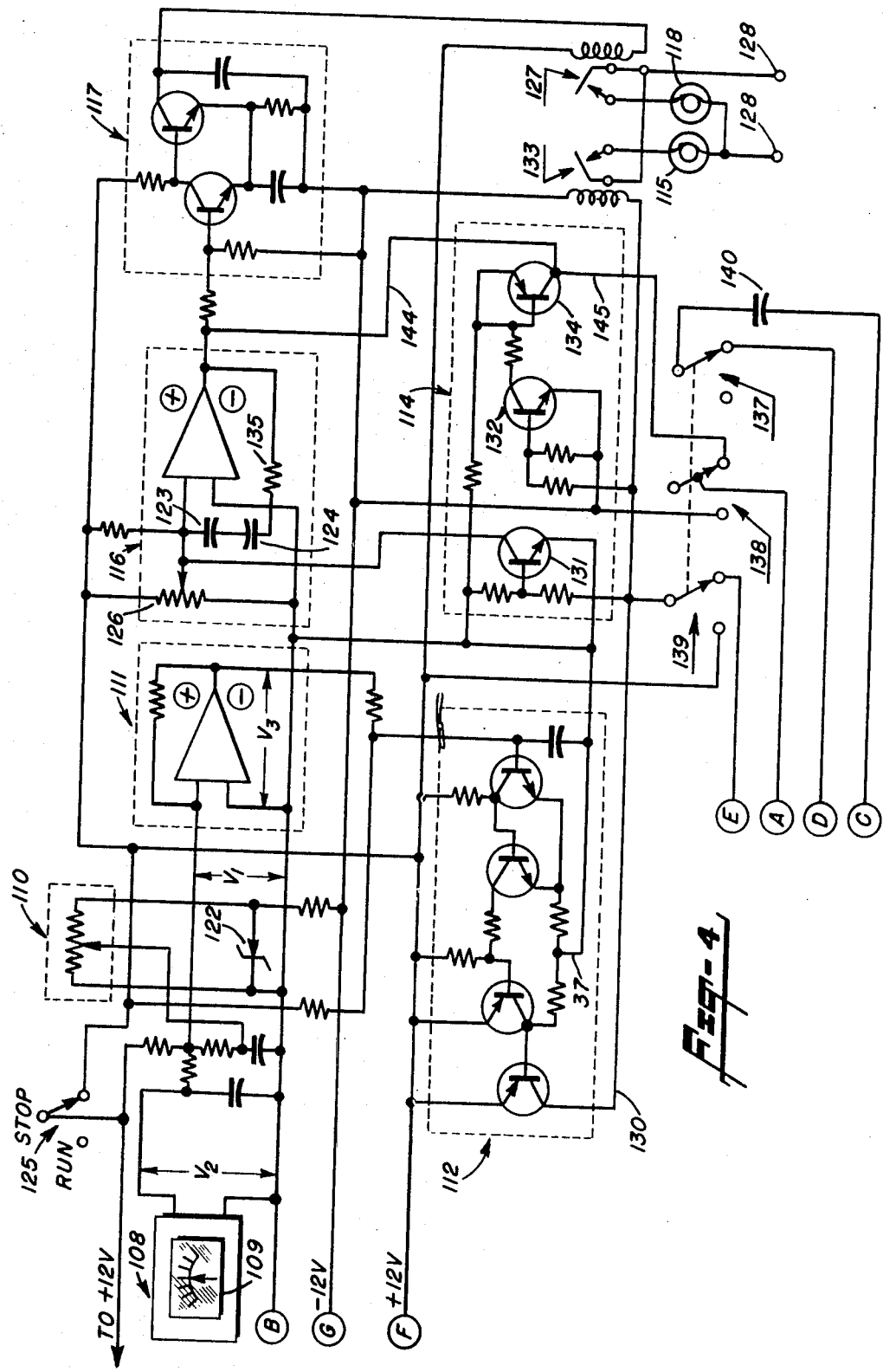
FIG. 4 is a circuit diagram of another portion of apparatus made in accordance with this invention.

Reference now is made to FIG. 4 which is a circuit diagram of the components forming the automatic portion of the apparatus just described. The reference potentiometer 110 comprises a 10 turn, high resolution potentiometer connected across the −12 volt supply leads in parallel with a zener diode 122. Adjustment of this potentiometer determines the magnitude of the reference voltage $V_1$ applied to the d.c. amplifier 111. The output voltage $V_2$ of the gaussmeter 108 also is applied to the amplifier in a sense opposed to the reference voltage and the amplifier output voltage $V_3$ is applied to the Schmidt trigger 112 having a triggering voltage, of say, 1.7 volts.

The ramp generator 116 is an integrating amplifier having the capacitors 123 and 124 connected in the feedback circuit and its operation is controlled by the switch 125. When this switch is set to the STOP position, a potential of +12 volts is applied to the input of the Schmidt trigger 112. Actuation of this Schmidt trigger results in a clamping of the ramp generator capacitors 123 and 124, as will be described more fully below. When this switch is set to the RUN position, these capacitors are unclamped and the generator functions to produce the negative-going voltage having a linear ramp waveform and a slope determined by the setting of the potentiometer 126. This voltage is applied to the Schmidt trigger 117. The maximum magnitude of the ramp voltage will equal the supply voltage, namely, −12 volts and the trigger 117 is set to have a somewhat lower triggering voltage, say −11 volts. Thus, just before the ramp generator reaches saturation, the trigger 117 flips, resulting in the energization of the operating coil of the power relay 127 having a set of normally open contacts. Closure of the relay contacts results in the energization of the incomplete light 118 by a suitable source of voltage connected to the terminals 128.

When the output voltage of the amplifier 111 is equal to or above the 1.7 volt triggering voltage of the Schmidt trigger 112 this trigger flips, whereby +12 volts appears on the lead 130. This voltage is applied to the bases of the normally non-conducting transistors 131 and 132 of the clamping circuit 114, and to the energizing coil of a second power relay 133. Closure of the contacts of this relay results in the energization of the complete light 115. The now-conducting transistor 131 connects one side of the ramp generator capacitors 123, 124 to the common ground lead 37. Upon conduction of the transistor 132, the normally non-conducting transistor 134 becomes conducting, thereby connecting the other side of the capacitors to ground through the resistor 135 to affect a discharge of the capacitors and a resetting of the ramp generator. Thus, as long as the trigger 112 remains in the flipped condition, the ramp generator is not running and the complete light remains lit.

The three, ganged switches 173, 138 and 139 serve to set the apparatus for either the manual or automatic mode of operation. Leads from these switches are brought out to terminals E, A, D and C, which terminals, together with those marked F, B and G, correspond to the similarly marked terminals in FIG. 1. Jumpers are assumed to connect together similarly marked terminals of FIGS. 1 and 4. When the ganged switches are set in the illustrated positions the apparatus is conditioned for automatic operation. The switch 139 connects the lead 130, of the Schmidt trigger 112, to the terminal E. Thus, when this trigger is in the flipped condition, a positive voltage appears on the terminal E and lead 141 of FIG. 1, which voltage is applied to the base of the clamping transistor 36 through the diode 142 and resistor 143 of the inhibiting circuit 40. This prevents the unijunction transistor 26 from oscillating during the time periods when the trigger is flipped, during which time periods the clamping circuit 114 prevents the ramp generator from running. The switch 138, FIG. 4, applies the output voltage of the ramp generator (leads 144 and 145) to the terminal A and the load 146 of FIG. 1. Thus, the negative-going ramp voltage is applied to the Schmidt trigger 56 (FIG. 1) through the potentiometers 50 and 51. As the ramp voltage becomes more negative the capacitors 45 will charge to higher and higher voltages before the trigger firing point is reached, thereby resulting in a train of current pulses flowing through the pull-down coil 61, each succeeding current pulse having a higher initial amplitude (Curve D, FIG. 3). The switch 137 (FIG. 4) connects together the terminals C and D of FIG. 1, thereby connecting the capacitor 140 (FIG. 4) in parallel with the capacitor 76 in the gate generator 66 (FIG. 1) and increasing the time period during which the gating transistor 63 is open. The circuit constants are such that this increased time period permits the capacitors 45 to discharge completely through the pull-down coil during each cycle of the ramp voltage.

When the three, ganged switches 137, 138 and 139 are set to the left, as viewed in FIG. 4, the apparatus is conditioned for manual mode of operation. The switch 137 is open, the switch 138 opens the output circuit of the ramp generator and the switch 139 applies +12 volts to the clamping circuit 114, thereby to prevent the ramp generator from operating even though the switch 125 is set in the RUN position. The apparatus now operates as has been described hereinabove with reference to FIG. 1.

The automatic mode of operation of the apparatus will now be described in more detail, it being assumed that a saturated permanent magnet is to be pulled down to a final magnetic intensity of 6,000 gauss. With the gaussmeter probe inserted into the air gap of a 6,000 gauss standard magnet, the reference potentiometer 110, FIG. 4, is adjusted until the Schmidt trigger 112 flips, thereby resulting in the energization of the complete light 115. Alternatively, with the switch 125 set in the STOP position and the magnet positioned within the pull-down coil, the gaussmeter probe is placed into engagement with a polar surface of the magnet. The probe is then moved slowly away from the magnet until the pointer of the indicating instrument 109, of the gaussmeter 108, is aligned with the 6,000 gauss scale mark. While retaining the probe in this position, the reference potentiometer is adjusted until the trigger 112 flips to turn on the complete light 115. It will be apparent that with either type of adjustment, the complete light will be energized when the probe of the gaussmeter is subjected to a magnetic field intensity of 6,000 gauss. The probe now is brought into engagement with a polar surface of the magnet. Under this condition, the increased magnitude of the gaussmeter output voltage results in an amplifier output voltage having a magnitude lower than the triggering voltage of the trigger 112, and the ramp generator is unclamped. Closure of the switch 125 sets the ramp generator into operation.

Referring to FIG. 1, the switch 99 is set to the ON position and the switch 96 is set to the CONTINUOUS position. Initially, the amplitude control switch 42 is set to apply a relatively low maximum charging voltage to the capacitors 45. Each ramp voltage results in the flow of a train of current pulses through the pull-down coil 61, Curve D of FIG. 3. Assuming these current pulses do not pull the magnet down to the 6,000 gauss level, the ramp generator would run to saturation. Just prior to saturation of the ramp generator the Schmidt trigger 117, FIG. 4 is flipped, thereby energizing the power relay 127 and energizing the incomplete light 118, which light will remain energized as long as the ramp generator continues to run to saturation. The potentiometers 50 and 51, FIG. 1 now are adjusted to increase the effective charging voltage applied to the capacitors 45. If the incomplete light is still energized, these potentiometers are returned to their starting positions and the amplitude control switch 42 is set to the next higher position. As the charging voltage is increased, the magnet under treatment is pulled down more and more and the output voltage of the gaussmeter decreases correspondingly. Eventually, by adjustment of the switch 42 and/or the potentiometers 50 and 51, the output voltage of the amplifier 111 reaches the triggering voltage of the Schmidt trigger 112 (FIG. 4). When this trigger flips, three functions occur simultaneously, namely, the clamping circuit 114 clamps the ramp generator capacitors 123 and 124, thereby stopping operation of the generator, the power relay 133 is actuated to energize the complete light 115, and a positive voltage is applied to the base of the clamping transistor 36, FIG. 1. The latter causes the unijunction transistor 26 to stop oscillating, thereby discontinuing the charging of the capacitors 45. The magnet now has been pulled down to the 6,000 gauss level.

Thereafter, other similar magnets can be similarly treated without further adjustment of the control elements of the apparatus, the magnets being removed from and inserted into the pull-down coil when the switch 125, FIG. 4, is set to the STOP position. It here is pointed out that the power relays 123 and 127 may include additional sets of contacts to provide indications or control functions at remote points.

Having now described the invention those skilled in this art will be able to make various changes and modifications without thereby departing from the spirit and scope of the invention as recited in the following claim.

We claim:

1. A capacitor charging circuit comprising,
    a. a capacitor,
    b. a power transformer having a primary and a secondary winding,
    c. a rectifier bridge having input junctions connected across the said secondary winding and output junctions connected across the capacitor,
    d. a pair of silicon controlled rectifiers connected in parallel but opposite sense between one end of the power transformer primary winding and one side of an a.c. line, the other end of said primary winding being connected to the other side of the a.c. line,
    e. a pulse transformer having a primary winding and a pair of secondary windings,
    f. leads connecting each of the pulse transformer secondary windings across the gate and cathode electrodes of an associated one of said silicon controlled rectifiers,
    g. an oscillator circuit comprising a unijunction transistor having a second capacitor and the pulse transformer primary winding connected in series across its emitter and base-one electrodes,
    h. means normally energizing the oscillator circuit for oscillation at the frequency of the said a.c. line,
    i. a normally non-conducting clamping transistor having its output circuit connected to the emitter and base-two electrodes of the unijunction transistor,
    j. a potentiometer connected across the output junctions of said rectifier bridge,
    k. a Schmidt trigger actuated upon the application thereto of a d.c. voltage of predetermined magnitude,
    l. means applying the output voltage of said potentiometer to the Schmidt trigger, and
    m. means changing said clamping transistor to the conducting state when the Schmidt trigger is actuated.

* * * * *